US007890036B2

(12) United States Patent
Kitano et al.

(10) Patent No.: US 7,890,036 B2
(45) Date of Patent: Feb. 15, 2011

(54) IMAGE FORMING METHOD, IMAGE FORMING APPARATUS, AND FIXING DEVICE

(75) Inventors: Yoshihisa Kitano, Kanagawa (JP); Toshiharu Enomae, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 852 days.

(21) Appl. No.: 11/076,972

(22) Filed: Mar. 11, 2005

(65) Prior Publication Data

US 2005/0219641 A1 Oct. 6, 2005

(30) Foreign Application Priority Data

Mar. 30, 2004 (JP) ........................... P2004-099180

(51) Int. Cl.
*G03G 15/20* (2006.01)
*H04N 1/21* (2006.01)
*H04N 1/23* (2006.01)
*H04N 1/40* (2006.01)

(52) U.S. Cl. ....................... 399/320; 399/328; 399/331; 399/335; 399/336; 399/341; 358/296; 358/448

(58) Field of Classification Search ................. 358/296, 358/448; 399/302, 325, 341, 320, 328, 331, 399/335, 336
See application file for complete search history.

(56) References Cited

U.S. PATENT DOCUMENTS

| | | | | |
|---|---|---|---|---|
| 5,571,652 | A | 11/1996 | Asano et al. | |
| 5,745,830 | A * | 4/1998 | Fujiwara et al. | 399/308 |
| 6,185,380 | B1 * | 2/2001 | Abe et al. | 399/18 |
| 6,408,158 | B1 * | 6/2002 | Takahata et al. | 399/302 |
| 2002/0102118 | A1 * | 8/2002 | Kosugi et al. | 399/341 |
| 2003/0049553 | A1 * | 3/2003 | Nakamura et al. | 430/108.21 |
| 2003/0113142 | A1 * | 6/2003 | Yoda et al. | 399/325 |

FOREIGN PATENT DOCUMENTS

| | | |
|---|---|---|
| JP | 61-20075 | 1/1986 |
| JP | 7-120965 | 5/1995 |
| JP | 2000-352888 A | 12/2000 |
| JP | 2003-5571 | 1/2003 |
| JP | 2003-58009 | 2/2003 |

* cited by examiner

*Primary Examiner*—Mark K Zimmerman
*Assistant Examiner*—Fan Zhang
(74) *Attorney, Agent, or Firm*—Morgan, Lewis & Bockius LLP

(57) ABSTRACT

An image forming method, which includes transferring an image of toner on an image carrying member to a recording medium, and fixing the image transferred to the recording medium, includes: smoothening a surface of the image transferred to the recording medium; and penetrating the image into the recording medium without contact on the surface of the image on the recording medium. The penetrating is a final process of the fixing.

14 Claims, 10 Drawing Sheets

IMAGE FORMING METHOD, IMAGE FORMING APPARATUS, AND FIXING DEVICE

BACKGROUND OF THE INVENTION

1. Field of the Invention

The present invention relates to a process for forming an image employing, for example, an electrophotographic system for transferring and fixing an image formed of a toner on an image carrying member to a recording medium, and in particular, it relates to improvements of a process for forming an image, an apparatus for forming an image, and a fixing device, that are effective for imparting gloss to an image formed of a toner on a recording medium.

2. Description of the Related Art

A conventional apparatus for forming an image using the electrophotographic system generally uses such a system that an image formed of a toner is carried on an image carrying member, such as a photoreceptor drum and an intermediate transfer belt, and the image is transferred and fixed to paper as a recording medium.

This kind of the image forming apparatus may have, as a fixing device for rapidly fixing the toner image to the recording medium, a first non-contact fixing unit for heating the surface of the recording medium in a non-contact manner, and a second contact fixing unit disposed in the downstream side of the first fixing unit along the transporting direction of the recording medium. In the second fixing unit, the recording medium is nip-transported under heating and pressing between a pair of fixing rolls, which are rotated in contact with each other (as disclosed, for example, in JP-A-2000-352888).

In this kind of the image forming apparatus, however, there is such a technical problem that it is considerably difficult to change the gloss of the image fixed on the recording medium along with the gloss of the recording medium as equivalent to offset printed matters.

For example, in the case where an image forming apparatus providing high image gloss irrespective to the smoothness of the recording medium, a recording medium having a low smoothness provides poor texture due to the large difference in gloss between the recording medium and the image part.

SUMMARY OF THE INVENTION

The invention has been made in view of the above circumstances and provides such a method for forming an image, an apparatus for forming an image, and a fixing device that can reliably provide gloss for an image formed of a toner on a recording medium.

According to a first aspect of the invention, an image forming method including: transferring an image of toner on an image carrying member to a recording medium; and fixing the image transferred to the recording medium, comprises: smoothening a surface of the image transferred to the recording medium; and penetrating the image into the recording medium without contact on the surface of the image on the recording medium, in which the penetrating is a final process of the fixing.

According to a second aspect of the invention, an image forming apparatus includes: a transferring device for transferring an image of a toner on an image carrying member to a recording medium; and a fixing device for fixing the image transferred to the recording medium. In the image forming apparatus, the fixing device includes: an image smoothening unit for smoothening a surface of the image transferred to the recording medium, and an image penetrating unit, constituted as a final stage unit of the fixing device, for penetrating the image having been subjected to the image smoothening unit, into the recording medium without contact on the surface of the image on the recording medium.

According to a third aspect of the invention, an image forming apparatus including a transferring device for transferring an image of a toner on an image carrying member to a recording medium; and a fixing device for fixing the image transferred to the recording medium, comprises: an image smoothening unit, disposed on an upstream side of the fixing device, for smoothening a surface of the image transferred to the recording medium; and an image penetrating unit, constituted as a final stage unit of the fixing device, for penetrating the image having been subjected to the image smoothening unit, into the recording medium without contact on the surface of the image on the recording medium.

According to a fourth aspect of the invention, a fixing device for fixing an image of a toner transferred from an image carrying member to a recording medium, includes: an image smoothening unit for smoothening a surface of the image transferred to the recording medium, and an image penetrating unit, constituted as a final stage unit of the fixing device, for penetrating the image having been subjected to the image smoothening unit, into the recording medium without contact on the surface of the image on the recording medium.

According to a fifth aspect of the invention, an image forming method includes: transferring an image of a toner on an image carrying member to a recording medium; and fixing the image transferred to the recording medium, in which a cross-sectional shape of a surface of an image on the recording medium after subjecting to the fixing follows a cross-sectional shape of a surface of the recording medium.

DETAILED DESCRIPTION OF THE PREFFERED EMBODIMETNS

While the invention has been described in detail and with reference to specific embodiments thereof, it will be apparent to one skilled in the art that various changes and modifications can be made without departing from the scope thereof.

This application is based on Japanese patent application No. 2004-099180 filed on Mar. 30, 2004, the entire contents thereof being hereby incorporated by reference.

The inventors have investigated the mechanisms of exhibiting gloss in offset printing, and have found the following characteristic features.

a. A cross-sectional shape of a surface of a thinner layer can easily follow a cross-sectional shape of a surface of a recording medium.

b. A smooth ink surface is provided.

c. An ink is penetrated into a recording medium over a long period of time.

Based on the findings, the invention has been completed in that the image gloss can be changed along with the recording medium gloss, for example, in the electrophotographic system.

Figure 1:
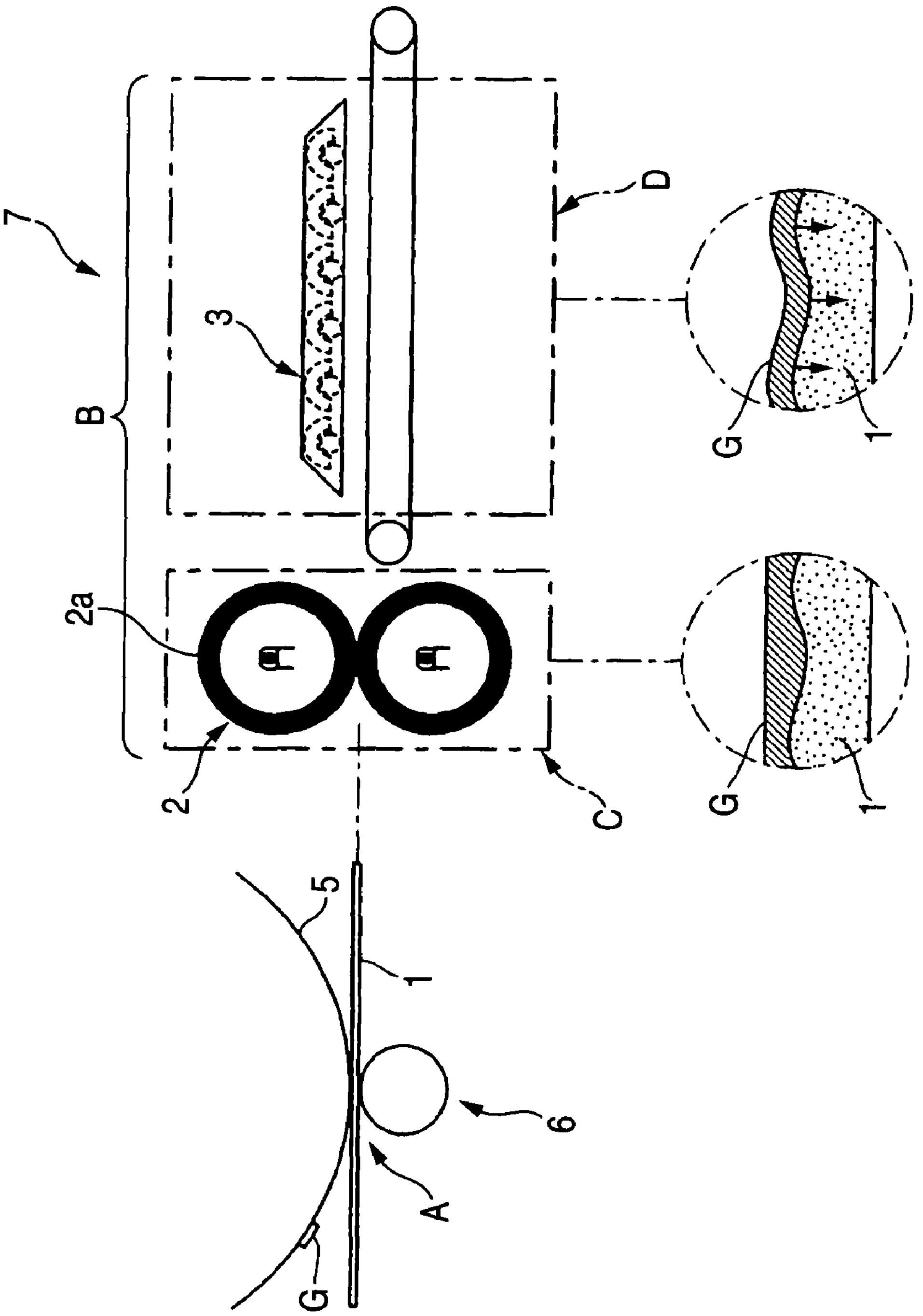
FIG. 1 is an explanatory view showing summary of the process for forming an image, the apparatus for forming an image, and the fixing device of the invention.

A process for forming an image of the invention, as a first aspect, as shown in FIG. 1, containing a transferring step A of transferring an image G formed of a toner on an image carrying member 5 to a recording medium 1, and a fixing step B of fixing the image G transferred to the recording medium 1, includes an image smoothening step C of smoothening a surface of the image G transferred to the recording medium 1, and an image penetrating step D of penetrating the image G having been subjected to the image smoothening step C, into the recording medium 1 without contact on the surface of the image G on the recording medium 1; and the image penetrating step D is the final step of the fixing step B.

From the standpoint of the cross-sectional shape of the surface of the image finally formed on the recording medium 1, the process for forming an image of the invention, as a second aspect, as shown in FIG. 1, contains a transferring step A of transferring an image G formed with a toner on an image carrying member 5 to a recording medium 1, and a fixing step B of fixing the image G transferred to the recording medium 1; and in the transferring step A and the fixing step B, the image G on the recording medium after subjecting to the fixing step B has a cross-sectional surface shape having followed a cross sectional surface shape of the recording medium 1.

The processes for forming an image of the invention can be applied to various kinds of image forming systems forming an image with a toner, such as the electrophotographic system and an electrostatic recording system.

The image carrying member 5 contains wide variety of materials that can carry an image G, and for example, it includes not only a photoreceptor drum, but also an intermediate transfer material capable of being used with the photoreceptor drum.

It is possible in the invention that the image smoothening step C is provided as one step contained in the fixing step B, i.e., the fixing step B contains both the image smoothening step C and the image penetrating step D, or in alternative, the image smoothening step C carried out separately from the fixing step B before the fixing step B.

Furthermore, it is sufficient that the image penetrating step D is the final step of the fixing step B.

The image penetrating step D is carried out without contact on the surface of the image G on the recording medium 1 because if the surface of the image G on the recording medium 1 is in contact with another member, the surface of the image G on the recording medium 1 is disturbed, whereby the cross-sectional shape of the image surface cannot follow a cross-sectional surface shape of the recording medium 1. The image penetrating step D can generally carried out by heating in a non-contact manner.

In the process for forming an image of the invention, the image smoothening step C may make a smoothness 2 or less, which corresponds to a surface roughness of the image with respect to a surface roughness of the recording medium 1.

The smoothness referred herein is the surface roughness of the image with respect to the surface roughness of the recording medium 1 because the surface roughness of the image is influenced by the surface roughness of the recording medium 1. As the index of the surface roughness, arbitrary parameters may be used, such as an arithmetic average surface roughness (Ra) and a ten-point average surface roughness (Rz). The smoothness may be 2 or less, because in the case where the smoothness exceeds 2, it is difficult to make the cross-sectional shape of the image surface follow a cross-sectional surface shape of the recording medium 1 in the image penetrating step D.

Furthermore, in the image smoothening step C carried out before the fixing step B, a toner having a shape factor of 130 or less and an average particle diameter of 7 μm or less may be used, and the image G formed of the toner on the image carrying member 1 is transferred to the recording medium 1. The use of a toner having a smaller diameter and a spherical shape may facilitate smoothening of the image G formed of the toner.

In the image penetrating step D, a transporting speed of the recording medium 1 may be smaller than at least a transporting speed of the recording medium 1 immediately before the image penetrating step D. This is because the image penetrating step D requires a certain period of time, and thus, necessary time may be obtained by decreasing the transporting speed of the recording medium 1.

An apparatus for forming an image of the invention for carrying out the process for forming an image of the invention, as a third aspect, as shown in FIG. 1, contains a transferring device 6 for transferring an image G formed of a toner on an image carrying member 5 to a recording medium 1, and a fixing device 7 for fixing the image 1 transferred to the recording medium 1; and the fixing device 7, includes an image smoothening unit 2 for smoothening a surface of the image G transferred to the recording medium 1, and an image penetrating unit 3, constituted as the final stage unit of the fixing device 7, for penetrating the image G having been subjected to the image smoothening unit 2, into the recording medium 1 without contact on the surface of the image G on the recording medium 1.

An apparatus for forming an image of the invention for carrying out the process for forming an image of the invention, as a fourth aspect, containing a transferring device 6 for transferring an image G formed of a toner on an image carrying member 5 to a recording medium 1, and a fixing device 7 for fixing the image 1 transferred to the recording medium 1; and as different from the embodiment shown in FIG. 1, the apparatus contains an image smoothening unit 2, disposed on an upstream side of the fixing device 7, for smoothening a surface of the image G transferred to the recording medium 1, and an image penetrating unit 3, constituted as the final stage unit of the fixing device 7, for penetrating the image G having been subjected to the image smoothening unit 2, into the recording medium 1 without contact on the surface of the image G on the recording medium 1.

In the apparatus for forming an image according to the third aspect, representative examples of the image smoothening unit 2 include a contact fixing unit having a fixing member 2*a* being made in contact with the surface of the image on the recording medium 1, and the surface of the image is smoothened with the fixing member 2*a*.

In this embodiment, the fixing member 2*a* may be such a member including a roll form or a belt form that can be heated to a prescribed fixing temperature mainly with a heat source, and the image smoothening unit 2 may be a contact fixing unit having a fixing member having a smoothness smaller than a surface roughness of the image with respect to a surface roughness of the recording medium 1.

In the apparatuses for forming an image according to the third and fourth aspects, the thickness of the layers for respective colors, which are subjected the image smoothening unit 2, may be arbitrarily determined, and the thickness may be as small as possible unless the image formation is impaired. By using thin layers, heat for the smoothening treatment can be sufficiently transmitted to facilitate melting of the toner layers, whereby the smoothening treatment is effectively carried out.

In the apparatuses for forming an image according to the third and fourth aspects, representative examples of the image penetrating unit 3 include a non-contact thermal fixing unit (such as an oven) radiating heat onto the image G on the recording medium 1.

The invention is not limited to the aforementioned apparatuses for forming an image, but provides a fixing device used in the apparatuses for forming an image.

The fixing device of the invention for fixing an image G formed of a toner transferred from an image carrying member 5 to a recording medium 5, as shown in FIG. 1, and the fixing device 7 contains an image smoothening unit 2 for smoothening a surface of the image G transferred to the recording medium 1, and an image penetrating unit 3, constituted as the final stage unit of the fixing device 7, for penetrating the image G having been subjected to the image smoothening unit 2, into the recording medium 1 without contact on the surface of the image G on the recording medium 1.

According to the process for forming an image of the invention, the cross-sectional shape of the surface of the image on the recording medium after the fixing step follows the cross-sectional surface shape of the recording medium, whereby the image gloss can be changed along with the recording medium gloss so as to provide easily an image with high gloss as similar to offset printing.

In particular, according to the apparatus for forming an image of the invention, the process for forming an image of the invention can be easily practiced.

Furthermore, according to the fixing device of the invention, such an image forming apparatus can be easily and reliably provide that can change the image gloss along with the recording medium gloss.

The invention will be described in detail with reference to embodiments shown in the attached drawings.

Embodiment 1

Figure 2:
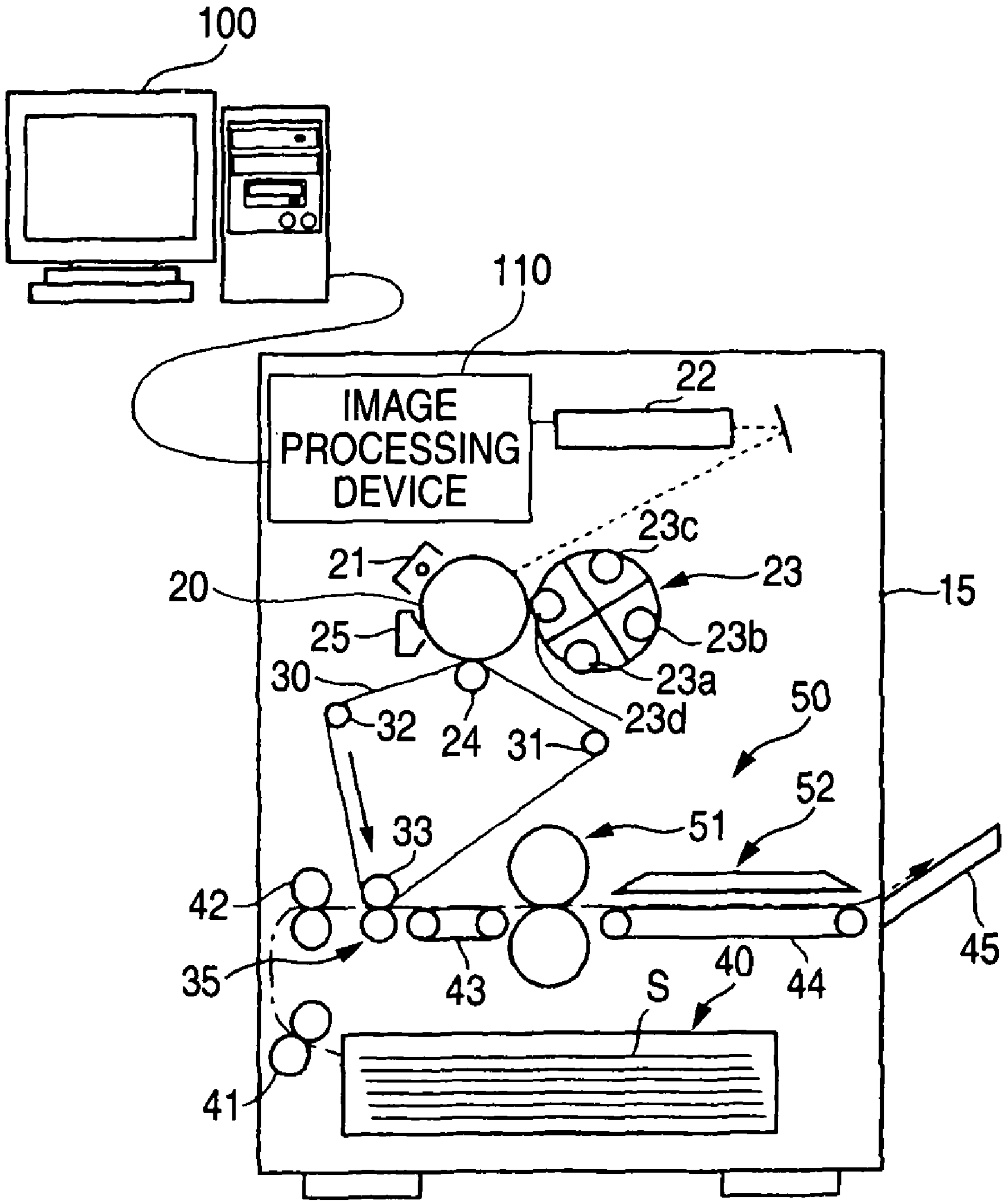
FIG. 2 is an explanatory view showing an overall constitution of an apparatus for forming an image according to Embodiment 1, to which the invention is applied.

FIG. 2 is an explanatory view showing an entire constitution of an image forming apparatus according to Embodiment 1, to which the invention is applied.

In the embodiment shown in FIG. 2, the image forming apparatus is a color image forming apparatus employing the electrophotographic system, which has, in a chassis 15, a rotating photoreceptor drum 20 and an intermediate transfer belt 30, which is disposed to face the photoreceptor drum and circularly rotates in the direction shown by the arrow.

In the embodiment, there are provided around the photoreceptor drum 20 a charging device 21, such as corotron; an optical beam scanning device 22 for writing electrostatic latent images of respective colors (i.e., black (K), yellow (Y), magenta (Y) and cyan (C)) on the photoreceptor drum 20; a rotary developing device 23 for visualizing the electrostatic latent images on the photoreceptor drum 20 by plural unit developing devices 23*a* to 23*d* switchably installed therein, in which color toners corresponding to the colors of the electrostatic latent images written on the photoreceptor 20, respectively; a primary transferring device 24, such as a transfer roll, for transferring the toner images on the photoreceptor drum 20 to the intermediate transfer belt 30; and a cleaner 25 for cleaning the remaining toner on the photoreceptor drum 20.

In the embodiment, an image processing device 110 is disposed in the chassis 15, and the image processing device 110 receives image information from an external personal computer 100 and feeds to the optical beam scanning device 22 an image signal having been subjected to an image process in the image processing device 110.

The toners used in the unit developing devices 23*a* to 23*d* of the rotary developing device 23 each is constituted by a thermoplastic binder resin containing a yellow, magenta, cyan or black colorant. Known materials may be used for the material constituting the toners, and from the standpoint of maintaining favorably the smoothness of the image, a spherical toner having a small diameter, for example, a toner having a shape factor of 130 or less and an average particle diameter of 7 μm or less, may be used. The exposing conditions and the developing conditions are controlled in such a manner that the toner amount on paper S as a recording medium is about from 0.3 to 0.7 mg/cm$^2$ depending on the content of the colorant.

While the embodiment does not contain an image scanner, an image scanner may be provided, and in this case, image information read by the image scanner may be fed to the optical beam scanning device 22. While the embodiment uses the rotary developing device 23, the invention is not limited thereto, and plural developing devices provided independently for the colors may be switchably arranged in parallel.

In the embodiment, the intermediate transfer belt 30 is stretched among the stretching rolls 31 to 33 and is circularly transported, for example, with one of the stretching rolls 31 to 33 as a driving roll.

The intermediate transfer belt 30 may be formed of a resin film as a base material having a prescribed thickness and containing a conductive agent. In order to transfer electrostatically the toner image from the photoreceptor drum 20 to the intermediate transfer belt 30, the volume resistivity of the intermediate transfer belt 30 is adjusted to a range of from $10^8$ to $10^{14}$ Ω·cm by changing the addition amount of the conductive agent, such as carbon black.

Examples of the resin film used as the base material include a polyimide film and a heat resistant film having a thickness of from 10 to 300 μm, for example, a polymer sheet of polyester, polyethylene terephthalate, polyether sulfone, polyether ketone, polysulfone, polyimideamide, polyamide and the like.

A secondary transferring device 35, such as a transfer roll, is provided on the intermediate transfer belt 30 at a position facing the stretching roll 33, and a secondary transfer bias voltage is applied to the secondary transferring device 35, whereby a multicolor image formed by primarily transferring the images of the respective colors to the intermediate transfer belt 30 is transferred to the paper S by the secondary transferring device 35.

A paper feeding tray 40 containing feedably paper S is disposed in a lower part of the chassis 15. The paper S fed from the paper feeding tray 40 is transported to the secondary transferring part through transporting rolls 41 and registration rolls 42 for alignment, and after receiving the image at the secondary transferring part, the paper S is subjected to a fixing treatment with a fixing device 50 while transporting with transporting belts 43 and 44, and then delivered to an output tray 45.

Figure 3A:
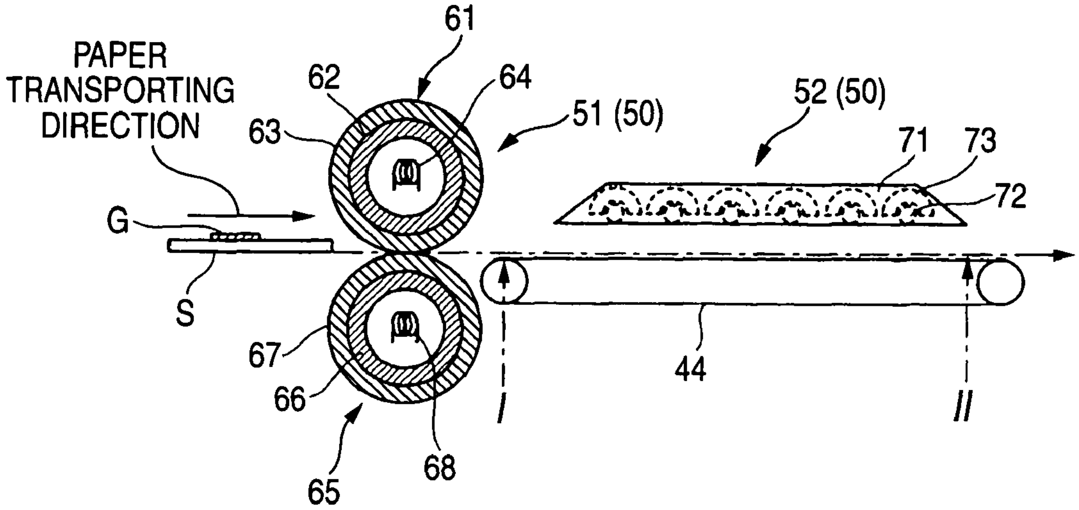
FIG. 3A is an explanatory view showing an important part of the apparatus for forming an image according to Embodiment 1.

In the embodiment, as shown in FIG. 3A, the fixing device 50 has a first fixing device 51 for smoothing the image G formed of the toner on the paper S, and a second fixing device 52 for penetrating the image G on the paper S having been subjected to the first fixing device 51, into the paper S.

As the first fixing device 51, a contact fixing unit in contact with the surface of the image on the paper S is used, which may be constituted, for example, by a heating roll 61 and a pressure roll 65 pressed on the heating roll 61 and rotating in contact with and along with the heating roll 61. The heating roll 61 and the pressure roll 65 each has a metallic roll 62 or 66, such as aluminum, having a heat resistant elastic layer 63 or 67, such as silicone rubber, formed thereon, and for example, a lamp heater 64 or 68 is disposed in the metallic roll 62 or 66.

In the embodiment, the surfaces of the heating roll 61 and the pressure roll 65 are polished to have a surface gloss of 50% or more. The surface gloss herein is a value measured by the 60° mirror surface method.

The pressure of the pressure roll 65 is from 100 to 150 kgf (from 980 to 1,470 N), the heating temperature of the heating roll 61 is from 150 to 200° C., and the heating temperature of the pressure roll 65 is from 100 to 150° C. The heating temperature of the lamp heaters 64 and 68 is set at about from 130 to 180° C.

As the second fixing device 52, a non-contact fixing unit heating the surface of the image on the paper S in a non-contact manner is used. The non-contact fixing unit may be constituted, for example, by an open fixing unit having a lamp holder 71 having plural lamp heaters 72 disposed therein with a certain distance from the surface of the paper transported, and having a reflector 73 disposed on the backside of the lamp heaters 72, whereby the surface of the paper S is irradiated with radiation heat directly from the lamp heaters 72 and through the reflector 73.

The operation of the image forming apparatus of the embodiment will be described.

When the image processing device 110 of the image forming apparatus receives prescribed image information from the personal computer 100, the image forming apparatus starts the prescribed image forming process.

In the image forming process, images of toners of the respective colors are consecutively formed on the photoreceptor drum 20 and then primarily transferred onto the intermediate transfer belt 30 at the primary transferring part to form a multiple transferred image formed of the toners of the respective colors. The transferred image is then secondarily transferred (bulk transfer) to the paper S at the secondary transferring part and then fixed on the paper through the fixing step with the fixing device 50, followed by delivering the paper S having the image fixed thereon to the output tray 45.

Figure 3B:
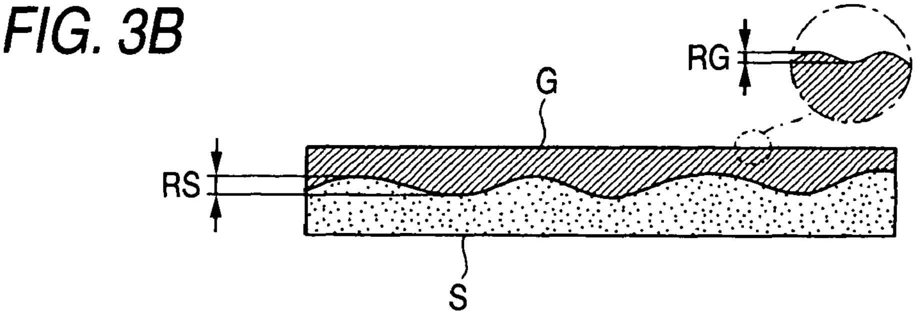
FIG. 3B is an explanatory view showing the state of the image in the part shown by I in FIG. 3A.

In the fixing step in the fixing device 50, the paper S having the image G transferred thereon is heated and pressed upon passing the first fixing device 51 at the nip region between the heating roll 61 and the pressure roll 62, whereby the image G on the paper S is smoothened to a surface roughness that is sufficiently smaller than the surface roughness RS (for example, Ra) of the paper S as shown in FIG. 3B.

The smoothness (for example, the ratio of the surface roughness of the image to the surface roughness of the paper) varies depending on the viscosity conditions of the toner, and the smoothness may be 2 or less when the toner has a low viscosity.

In the case where the thickness of the image layer upon passing the first fixing device 51 is small, a higher heat conductivity can be obtained to facilitate melting of the toner, whereby the surface of the image G easily becomes smooth.

The fixing speed in the first fixing device 51 may be such a range that the image can be smoothened, and in the case where the fixing speed is slow, a higher heat conductivity can be obtained to facilitate melting of the toner, whereby the surface of the image G easily becomes smooth.

The paper S having passed the first fixing device 51 is then transported to pass the second fixing device 52 via the transporting belt 44.

Figure 3C:
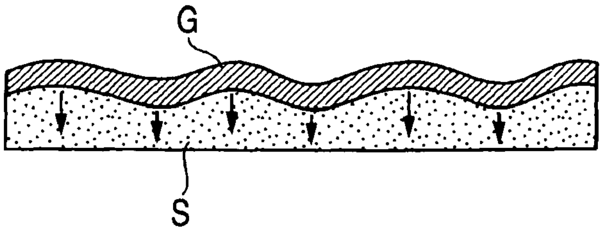
FIG. 3C is an explanatory view showing the state of the image in the part shown by II in FIG. 3A.

At this time, the image G on the paper S is gradually penetrated into the paper S with radiation heat from the second fixing device 52, and exhibits such a cross-sectional surface shape that is in accordance with the surface roughness of the paper S, as shown in FIG. 3C.

Upon measuring the gloss of the image on the paper S in this stage by the 60° mirror surface method, it has been confirmed that the image gloss is changed according to the paper gloss, and it is also confirmed that images having high gloss can be obtained for paper S having various extents of gloss.

In the second fixing device 52, such a period of time is necessarily ensured that the image G on the paper S is gradually penetrated into the paper S. In the case where the length of the fixing region of the second fixing device 52 can be sufficiently long, the fixing speeds of the first fixing device and the second fixing device may be the same as each other. However, in the case where the length of the fixing region of the second fixing device 52 cannot be sufficiently long, the fixing speed of the second fixing device 52 may be smaller than the fixing speed of the first fixing device 51.

Embodiment 2

Figure 4:
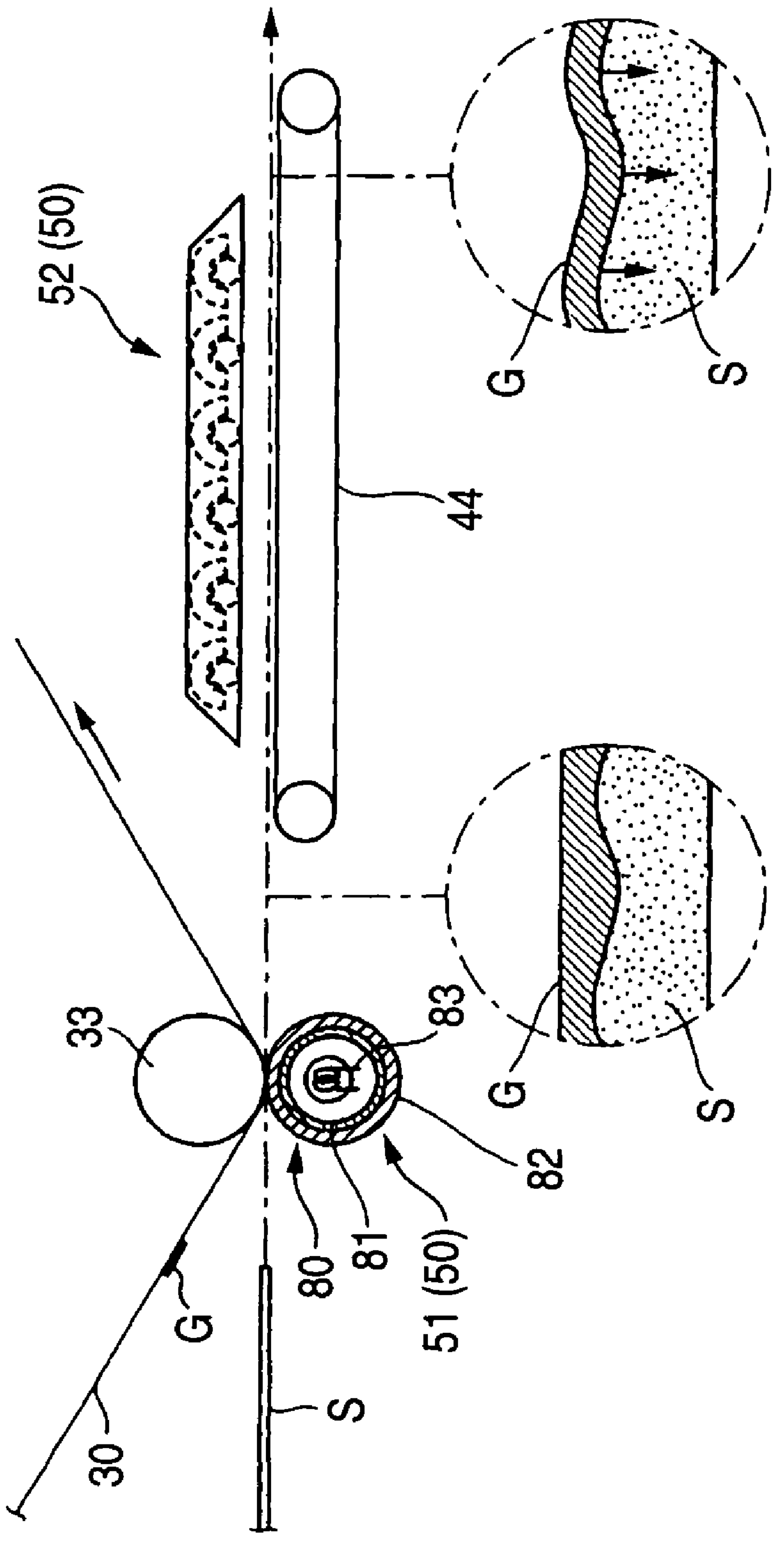
FIG. 4 is an explanatory view showing an important part of an apparatus for forming an image according to Embodiment 2, to which the invention is applied.

FIG. 4 is an explanatory view showing an important part of an image forming apparatus according to Embodiment 2, to which the invention is applied.

In Embodiment 2 shown in FIG. 4, the image forming apparatus has the same basic constitution as in Embodiment 1, and, as different from Embodiment 1, a fixing device 50 has a first fixing device 51, in which the image G on the intermediate transfer belt 30 is transferred to the paper S and simultaneously fixed thereon, and the image G on the paper S is penetrated into the paper S by the second fixing device 52 disposed after the first fixing device 51. The same constitutional elements as in Embodiment 1 are attached to the same symbols as in Embodiment 1 to omit detailed descriptions thereof.

In the embodiment, the first fixing device 51 has the stretching roll 33 disposed in contact with a heating roll 80 with the intermediate transfer belt 30 intervening therebetween under pressure, whereby the image on the intermediate transfer belt 30 is transferred to the paper S and simultaneously fixed thereon at the nip region with the heating roll 80. The intermediate transfer belt 30 may have such a surface roughness that corresponds to the surface roughness of the heating roll 61 of the first fixing device 51 in Embodiment 1.

The heating roll 80 has a metallic roll 81, such as aluminum, having a heat resistant elastic layer 82, such as silicone rubber, formed thereon, and for example, a lamp heater 83 is disposed in the metallic roll 81.

As the second fixing device 52, the same non-contact fixing unit as in Embodiment 1 may be used.

In the embodiment, the image G on the paper S is heated and pressed at the nip region between the intermediate belt 30 and the heating roll 80 in the first fixing device 51, and thus the image G on the paper S is maintained smooth by transferring the surface state of the intermediate transfer belt 30.

The paper S having passed the first fixing device 51 then passes the second fixing device 52, at which the image G on the paper S is gradually penetrated into the paper S with radiation heat from the second fixing device 52, and exhibits such a cross-sectional surface shape that is in accordance with the surface roughness of the paper S, as similar to Embodiment 1. As a result, the image gloss is changed according to the paper gloss, and images having high gloss can be obtained for paper S having various extents of gloss.

Embodiment 3

Figure 5:
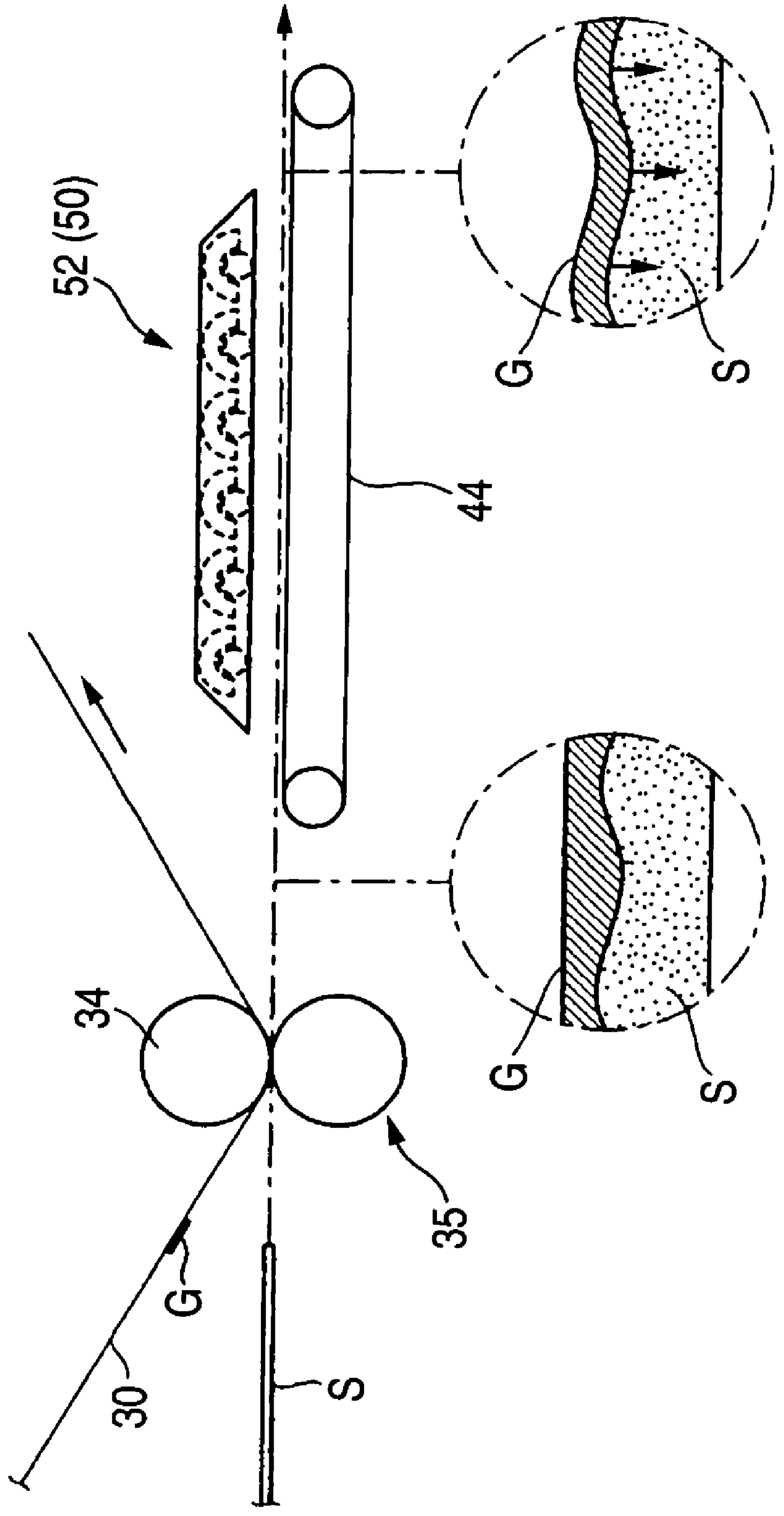
FIG. 5 is an explanatory view showing an important part of an apparatus for forming an image according to Embodiment 3, to which the invention is applied.

FIG. 5 is an explanatory view showing an important part of an image forming apparatus according to Embodiment 3, to which the invention is applied.

The image forming apparatus of Embodiment 3 shown in FIG. 5 is substantially the same as Embodiment 1, but as different from Embodiment 1, a fixing device 50 has only the second fixing device 52 (non-contact fixing unit), but a first fixing unit 51 is omitted.

In the embodiment, the image G transferred onto the paper S at the secondary transferring part can have a smooth surface, for example, in such a manner that a toner having a shape factor 130 or less and an average particle diameter of 7 μm or less is used, an intermediate transfer belt 30 having a small surface roughness with a gloss of 100% or more is used, and the transferring conditions for the secondary transferring device 35 are appropriately selected.

The image G on the paper S then passes the fixing device 50 (having only the second fixing device 52), at which the image G is gradually penetrated into the paper S and exhibits such a cross-sectional surface shape that is in accordance with the surface roughness of the paper S. As a result, as similar to Embodiment 1, the image gloss is changed according to the paper gloss, and images having high gloss can be obtained for paper Shaving various extents of gloss.

EXAMPLE

Example 1

An image forming apparatus according to Embodiment 1 (modified machine of DocuColor 1250, produced by Fuji Xerox Co., Ltd., the same as in Examples 2 to 4 below) is used as an example model. A comparative model is prepared by removing the second fixing device 52 from the image forming apparatus according to Embodiment 1, and an image forming apparatus by offset printing is used as another comparative model.

As an image formed of a toner herein, for example, a monochrome (for example, cyan) image is formed. In the example, the toner has a weight average molecular weight (Mw) of 54,000, a melting temperature (Tm) of 120° C. and a viscosity (η) at the melting temperature of 4,000 Pa·s. The toner has a shape factor of 130 and an average particle diameter of 7 μm, and the amount of the toner on the paper S is 0.5 mg/cm$^2$.

As the intermediate transfer belt 30, a polyimide film containing carbon black having a thickness of 70 μm and a surface roughness (Rz) of 2.0 or less is used.

Figure 6:
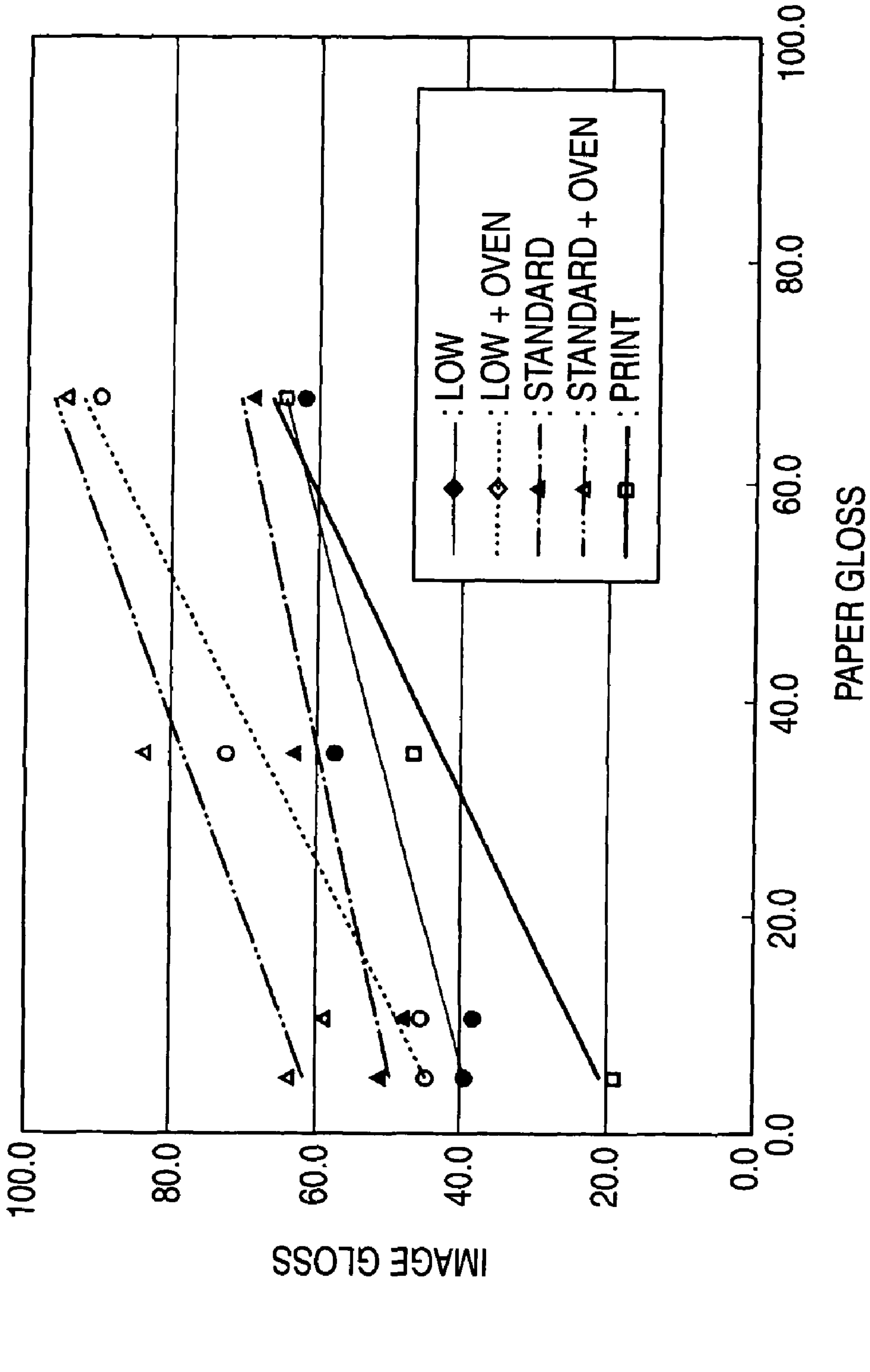
FIG. 6 is a graph showing the relationship between the paper gloss and the image gloss for the example model and the comparative model, under conditions where the thickness of the image is changed, in Example 1.

In the example model and the comparative models, the relationship between the paper gloss and the image gloss is measured by the 60° mirror surface method with the thickness of the image formed of the toner varying from "low" to "standard", and the results shown in FIG. 6 are obtained.

In FIG. 6, the term "low" means a thickness of the image formed of the toner of 2 μm with the comparative model, the term "standard" means a thickness of the image formed of the toner of 4 μm with the comparative model, the terms "low+oven" and "standard+oven" mean the example model for the respective thicknesses of the image, and the term "print" means offset printing with a thickness of an image with an ink of 0.8 μm.

It is confirmed by the results shown in the figure that there is such a tendency that the image gloss is changed according to the paper gloss in the example model, and particularly in the case where the image formed of the toner has a small thickness, the image gloss is changed according to the paper gloss with such a gradient that is equivalent to the case of offset printing.

In the comparative model, on the other hand, it is understood that the image gloss is not largely changed according to the paper gloss even though the thickness of the image formed of the toner is small.

Accordingly, it is understood that the example model of the example can provide an image having high gloss equivalent to offset printing.

Example 2

The example model and the comparative models as similar to Example 1 are used, and the relationship between the paper gloss and the image gloss is measured by the 60° mirror surface method with the fixing speed of the first fixing device 51 varying from "high speed" to "standard". The results shown in FIG. 7 are obtained.

Figure 7:
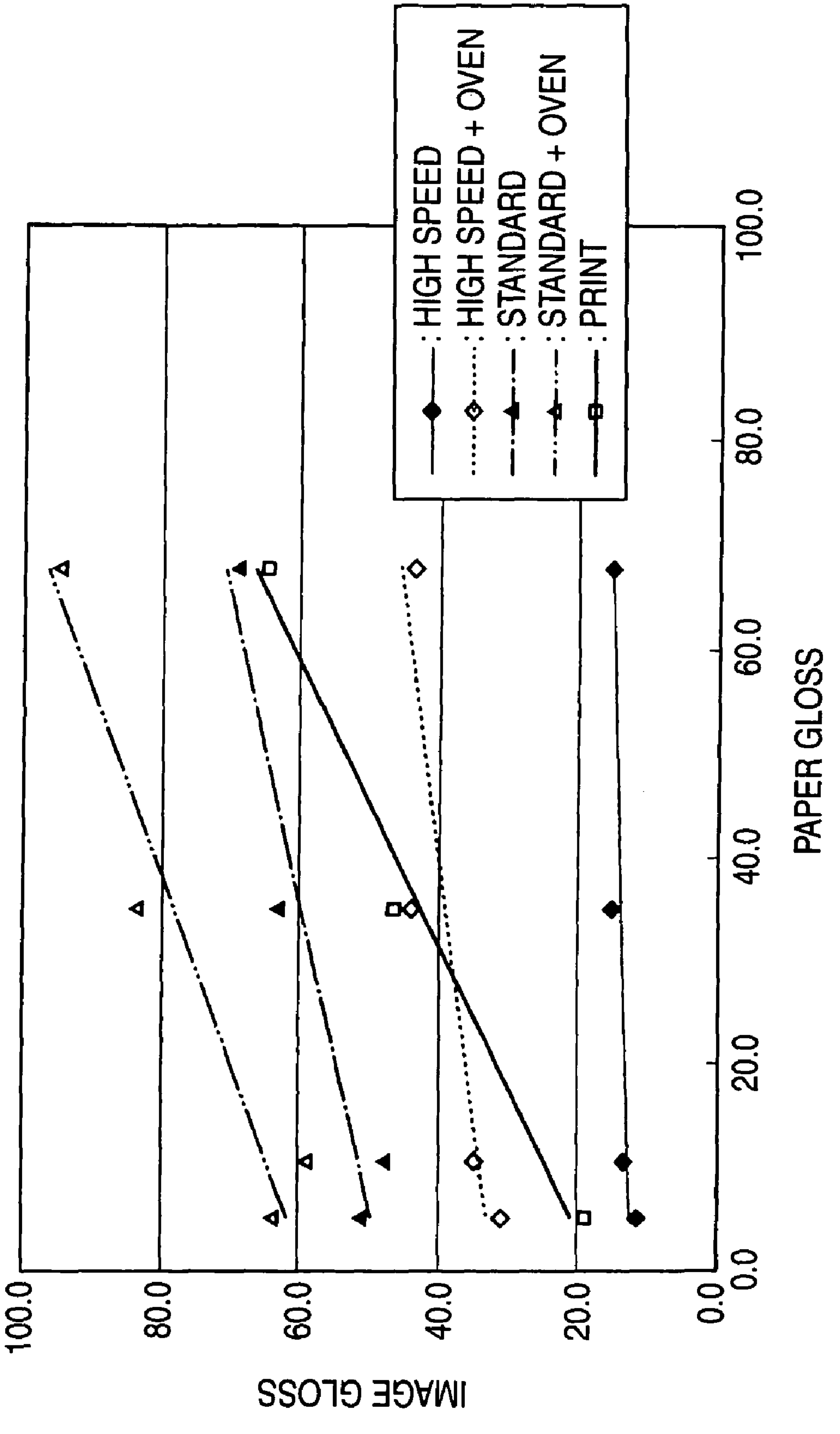
FIG. 7 is a graph showing the relationship between the paper gloss and the image gloss for the example model and the comparative model, under conditions where the time for the image smoothening step is changed, in Example 2.

In FIG. 7, the term "high speed" means a fixing speed of 220 mm/sec with the comparative model, the term "standard" means a fixing speed of 130 mm/sec with the comparative model, the terms "high speed+oven" and "standard+oven" mean the example model for the respective fixing speeds, and the term "print" means offset printing with a thickness of an image with an ink of 0.8 μm. The lower fixing speed provides a higher thermal conductivity to facilitate melting of the toner, and thus the surface of the image becomes smoother.

It is confirmed by the results shown in the figure that there is such a tendency that the image gloss is changed according to the paper gloss in the example model, and particularly in the case where the fixing speed is low (standard+oven), the image gloss is changed according to the paper gloss with such a gradient that is equivalent to the case of offset printing.

In the comparative model, on the other hand, it is understood that the image gloss is not largely changed according to the paper gloss in both the fixing speeds.

Accordingly, it is understood that the example model of the example can provide an image having high gloss equivalent to offset printing.

Example 3

The example model and the comparative models as similar to Example 1 are used, and the relationship between the paper gloss and the image gloss is measured by the 60° mirror surface method with the thickness of the image formed of the toner varying from "low" to "standard", and the fixing speed of the first fixing device 51 varying from "high speed" to "standard". The results shown in FIG. 8 are obtained.

Figure 8:
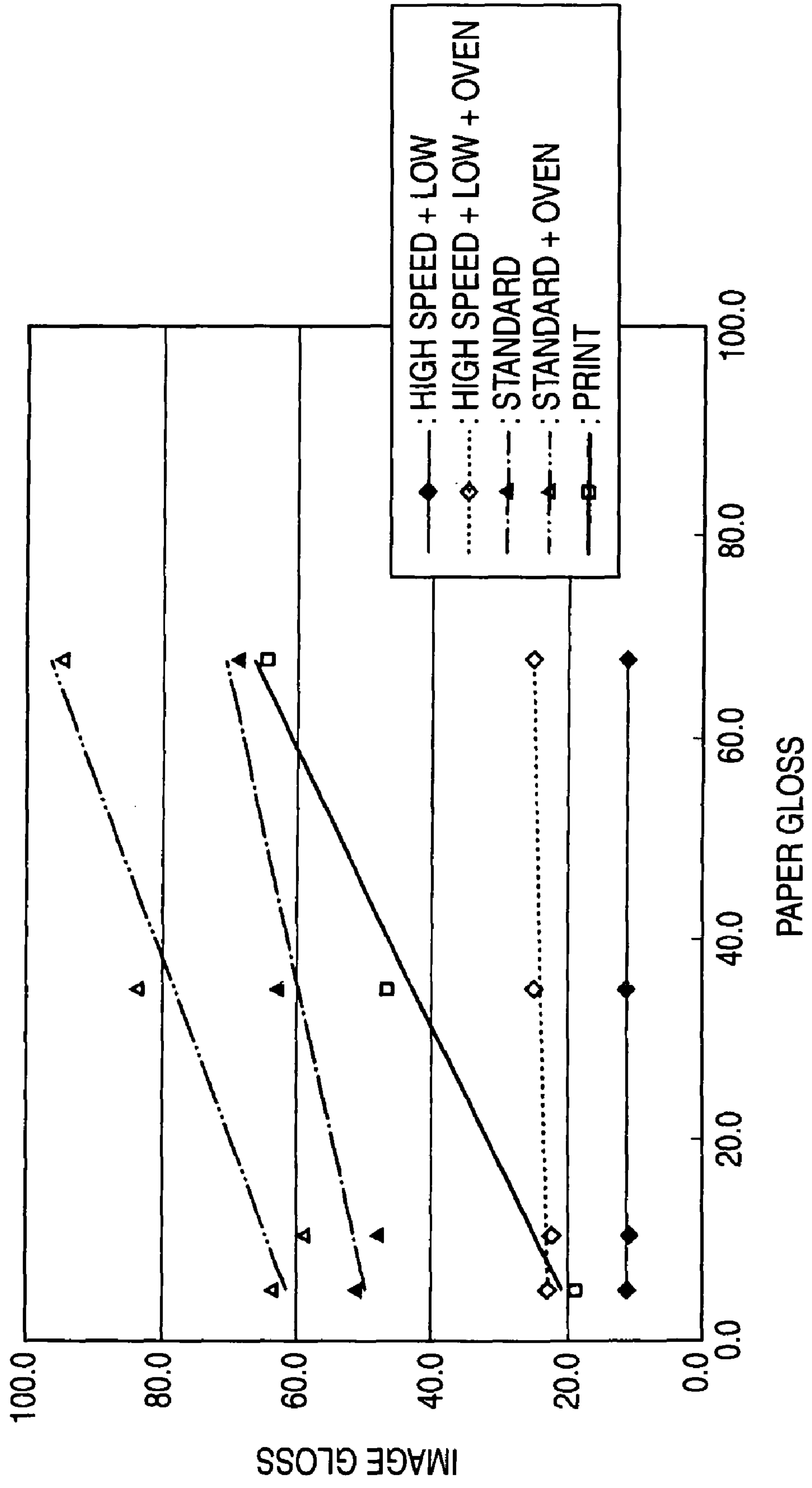
FIG. 8 is a graph showing the relationship between the paper gloss and the image gloss for the example model and the comparative model, under conditions where the thickness of the image and the time for the image smoothening step are changed, in Example 3.

In FIG. 8, the term "high speed" means a fixing speed of 220 mm/sec with the comparative model, the term "low" means a thickness of the image formed of the toner of 2 μm with the comparative model, the term "standard" means a fixing speed of 130 mm/sec and a thickness of the image formed of the toner of 4 μm with the comparative model, the terms "high speed+low+oven" and "standard+oven" mean the example model for the respective conditions, and the term "print" means offset printing with a thickness of an image with an ink of 0.8 μm.

It is understood from the results shown in the figure that in the example model with a high fixing speed, the image gloss is substantially not changed along with the paper gloss even through the thickness of the image formed of the toner is small.

It is confirmed that in the example model with the standard conditions for the thickness of the image formed of the toner and the fixing speed, the image gloss is changed according to the paper gloss with such a gradient that is equivalent to the case of offset printing.

In the comparative model, on the other hand, it is understood that the image gloss is not largely changed according to the paper gloss in both the cases of "high speed+low" and "standard".

Accordingly, it is understood that the example model of the example with the standard conditions can provide an image having high gloss equivalent to offset printing.

Example 4

The influence of the surface roughness of the image in the image smoothening step (i.e., the fixing step by the first fixing device 51) is investigated by using the same example model as in Example 1.

In the image smoothening step, such a fixing device 50 is used that the image G formed of the toner and the paper (recording medium) S are heated and pressed at a nip region, at which a heating roll 61 and a pressure roll 65 are pressed to each other, and the surface roughness of the image before entering into the image penetrating step is changed by changing the heating temperature. The heating temperature is changed from 140 to 180° C. by 10° C., and designated as levels 1 to 5 from the higher temperatures.

Figure 9:
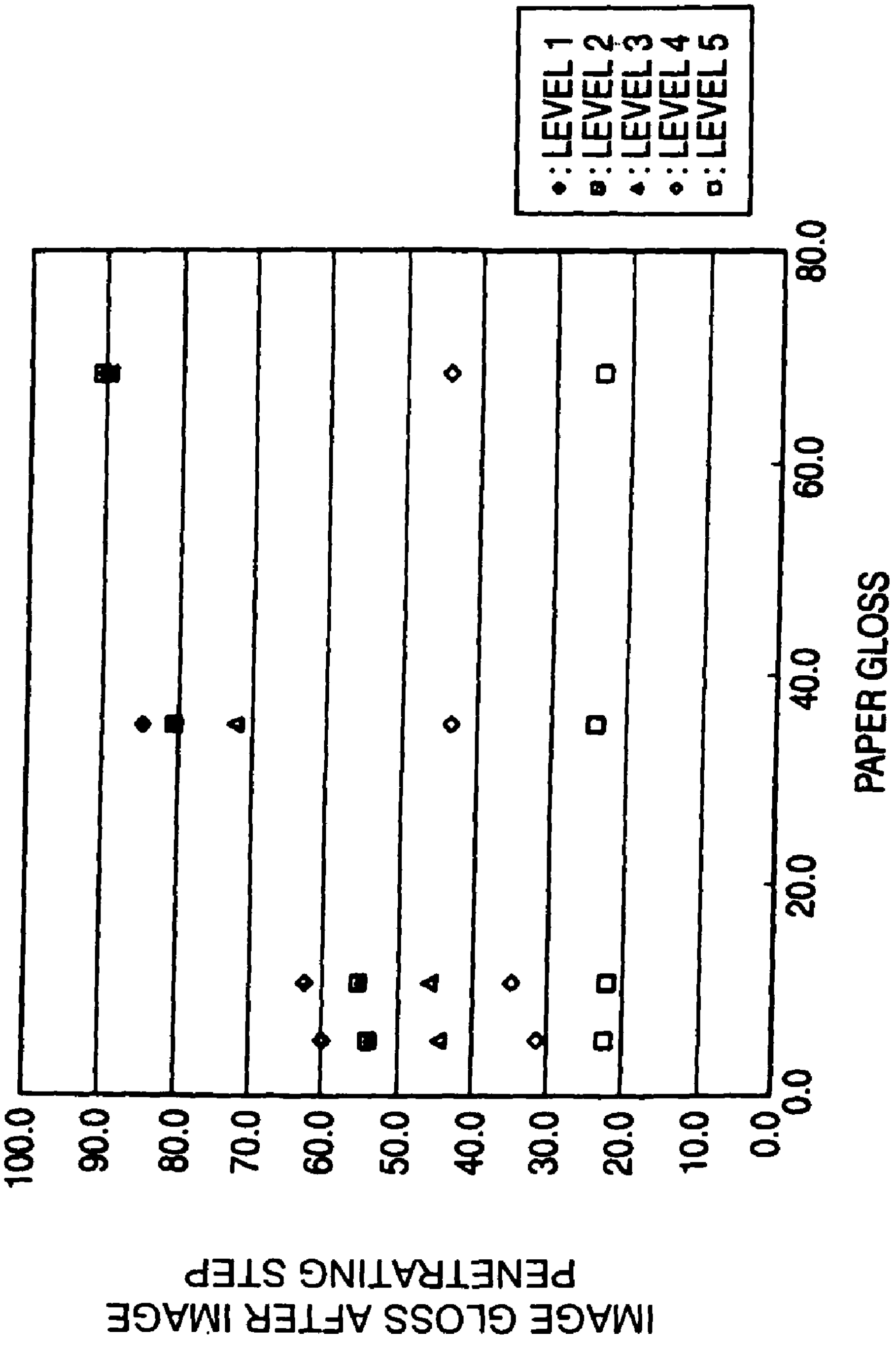
FIG. 9 is a graph showing the relationship between the paper gloss and the image gloss after the image penetrating step for the example model, under conditions where the surface roughness of the image on the paper before entering the image penetrating step is changed to levels 1 to 5, in Example 4.

The changes in gloss of the images having passed the non-contact fixing unit as the image penetrating step (i.e., the fixing step by the second fixing device 52) are shown in FIG. 9.

It is understood from the results shown in FIG. 9 that the image gloss is changed along with the paper gloss over the entire gloss region under the conditions of levels 1 to 3, but the image gloss is substantially not changed under the conditions of levels 4 and 5.

Figure 10:
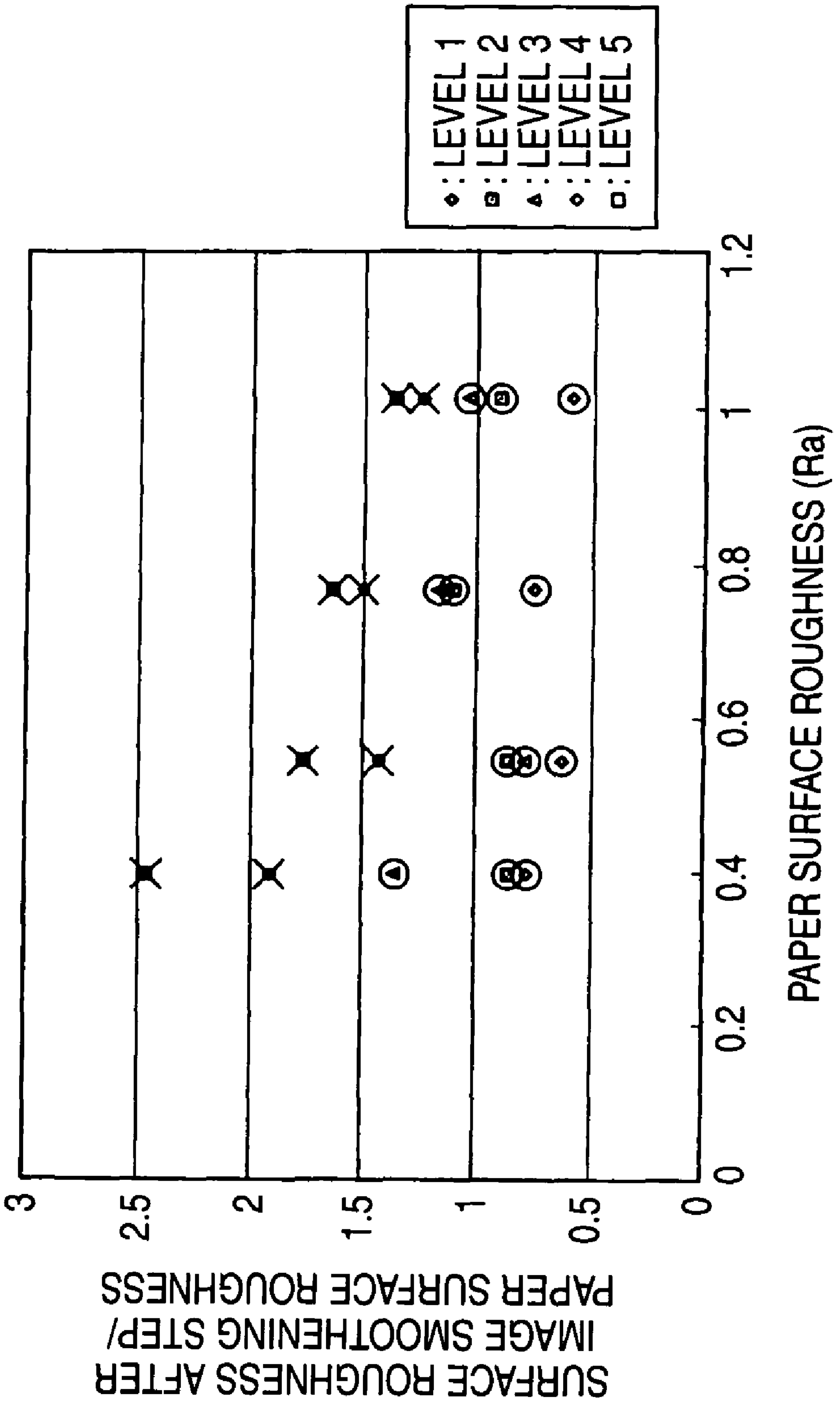
FIG. 10 is a graph showing the relationship between the surface roughness (Ra) of the paper and the value obtained by dividing the surface roughness (Ra) of the image after the image smoothening step by the surface roughness (Ra) of the paper, in Example 4.

The relationship between the surface roughness of the image and the surface roughness of the paper after completing the image smoothening step is investigated, and the results obtained are shown in FIG. 10. In FIG. 10, the abscissa is the surface roughness (Ra) of the paper, and the ordinate is a value obtained by dividing the surface roughness (Ra) of the image after the image smoothening step by the surface roughness (Ra) of the paper.

In FIG. 10, the points surrounded by circles indicate values changing in image gloss along with the paper gloss for levels 1 to 3, and the crossout points indicate values not changing in image gloss along with the paper gloss for levels 4 and 5.

It is found from the results shown in FIG. 10 that in the case where the ratio of the surface roughness of the image after the image smoothening step and the surface roughness of the paper is sufficiently large, the image gloss cannot exhibit the necessary gradient even through the image is subjected to the image penetrating step. In the example shown in FIG. 10, in particular, it is understood that the necessary gradient for the image gloss with respect to the paper gloss can be obtained when the ratio of the surface roughness of the image and the surface roughness of the paper (i.e., the smoothness) is suppressed to about less than 1.2.

It is expected for the smoothness that the surface roughness of the image after the image smoothening step differs according to the viscosity of the toner. Upon conducting experiments for toners having different viscosity conditions, it is confirmed that the necessary gradient for the image gloss can be obtained by suppressing the smoothness to about 2.0 or less.

What is claimed is:

1. An image forming method including:

transferring an image of toner on an image carrying member to a recording medium; and fixing the image transferred to the recording medium, comprising:

contact fixing a surface of the image after the image is transferred to the recording medium using an image contact fixing unit wherein the image contact fixing unit contacts the surface of the image on the recording medium, so that a smoothness which corresponds to a surface roughness of the image with respect to a surface roughness of the recording medium is 2 or less; and non-contact fixing the image into the recording medium without contact on the surface of the image on the recording medium, wherein the non-contact fixing is a final process of the fixing, and a transporting speed of the recording medium during the non-contact fixing of the image is smaller than a transporting speed of the recording medium during the contact fixing.

2. The image forming method according to claim 1, wherein the fixing comprises the contact fixing and the non-contact fixing.

3. The image forming method according to claim 1, wherein the contact fixing is carried out prior to the fixing.

4. The image forming method according to claim 1, wherein a length of a fixing region of the non-contact fixing is longer than a length of a fixing region of the contact fixing.

5. An image forming method comprising:

contact fixing by transferring an image with a toner having a shape factor of 130 or less and an average particle diameter of 7 μm or less formed on an image carrying member to a recording medium;

contact fixing a surface of the image after the image is transferred to the recording medium using an image contact fixing unit wherein the image contact fixing unit contacts the surface of the image on the recording medium; and non-contact fixing the image into the recording medium without contact on the surface of the image on the recording medium, wherein a transporting speed of the recording medium during the non-contact fixing of the image is smaller than a transporting speed of the recording medium during the contact fixing.

6. An image forming apparatus comprising:

a transferring device that transfers an image of a toner on an image carrying member to a recording medium; and a fixing device that fixes the image transferred to the recording medium, wherein the fixing device comprises:

an image contact fixing unit that smoothens a surface of the image after the image is transferred to the recording medium wherein the image contact fixing unit contacts the surface of the image on the recording medium, and an image non-contact fixing unit, constituted as a final stage unit of the fixing device, that penetrates the image having been subjected to the image contact fixing unit, into the recording medium without contact on the surface of the image on the recording medium, wherein a transporting speed of the recording medium during the non-contact fixing of the image is smaller than a transporting speed of the recording medium during the contact fixing.

7. The image forming apparatus according to claim 6, wherein the image contact fixing unit is a contact fixing unit having a fixing member being made in contact with the surface of the image on the recording medium, and the surface of the image is smoothened with the fixing member.

8. The image forming apparatus according to claim 7, wherein a smoothness of the fixing member is smaller than a surface roughness of the image with respect to a surface roughness of the recording medium.

9. The apparatus according to claim 6, wherein the image non-contact fixing unit is a non contact thermal fixing unit radiating heat onto the image on the recording medium.

10. The image forming apparatus according to claim 6, wherein a length of a fixing region of the non-contact fixing is longer than a length of a fixing region of the contact fixing.

11. An image forming apparatus including a transferring device for transferring an image of a toner on an image carrying member to a recording medium; and a fixing device for fixing the image transferred to the recording medium, comprising:

an image contact fixing unit, disposed upstream of the fixing device, that smoothens a surface of the image after the image is transferred to the recording medium wherein the image contact fixing unit contacts the surface of the image on the recording medium; and an image non-contact fixing unit, constituted as a final stage unit of the fixing device, that penetrates the image having been subjected to the image contact fixing unit, into the recording medium without contact on the surface of the image on the recording medium, wherein a transporting speed of the recording medium during the non-contact fixing of the image is smaller than a transporting speed of the recording medium during the contact fixing.

12. The apparatus according to claim 11, wherein the image non-contact fixing unit is a non contact thermal fixing unit radiating heat onto the image on the recording medium.

13. A fixing device for fixing an image of a toner transferred from an image carrying member to a recording medium, the fixing device comprising:

an image contact fixing unit that smoothens a surface of the image after the image is transferred to the recording medium wherein the image contact fixing unit contacts the surface of the image on the recording medium, and an image non-contact fixing unit, constituted as a final stage unit of the fixing device, that penetrates the image having been subjected to the image contact fixing unit, into the recording medium without contact on the surface of the image on the recording medium, wherein a transporting speed of the recording medium during the non-contact fixing of the image is smaller than a transporting speed of the recording medium during the contact fixing.

14. An image forming method comprising:

transferring an image of a toner on an image carrying member to a recording medium; and fixing the image transferred to the recording medium by first contact fixing a surface of the image after the image is transferred to the recording medium using an image contact fixing unit wherein the image contact fixing unit contacts the surface of the image on the recording medium and subsequently non-contact fixing the image into the recording medium without contact on the surface of the image on the recording medium, wherein a cross-sectional shape of a surface of an image on the recording medium after subjecting to the fixing follows a cross-sectional shape of a surface of the recording medium, and a transporting speed of the recording medium during the non-contact fixing of the image is smaller than a transporting speed of the recording medium during the contact fixing.

* * * * *